United States Patent [19]
Tischer et al.

[11] Patent Number: 5,722,297
[45] Date of Patent: Mar. 3, 1998

[54] ACTUATOR SYSTEM FOR GEAR SHIFTING MECHANISMS OF MOTOR VEHICLES

[75] Inventors: Dieter Tischer, Wendlingen; Roland Meyer, Roth, both of Germany

[73] Assignee: Hydraulik-Ring Antrieb- und Steuerungstechnik GmbH, Nürtingen, Germany

[21] Appl. No.: 610,669

[22] Filed: Mar. 4, 1996

[30] Foreign Application Priority Data

Mar. 4, 1995 [DE] Germany .................. 195 07 705.9

[51] Int. Cl.⁶ ......................................... B60K 20/02
[52] U.S. Cl. ............................. 74/473 R; 74/335
[58] Field of Search .................. 74/335, 473 SW, 74/473 R

[56] References Cited

U.S. PATENT DOCUMENTS

| | | |
|---|---|---|
| 4,104,929 | 8/1978 | Kessmar .................. 74/473 R |
| 5,063,810 | 11/1991 | Fujii .................. 74/473 R |
| 5,150,629 | 9/1992 | Morris et al. .................. 74/473 R |

*Primary Examiner*—Charles A. Marmor
*Assistant Examiner*—Sherry Lynn Estremsky
*Attorney, Agent, or Firm*—Robert W. Becker & Associates

[57] ABSTRACT

An actuator system for a gear shifting mechanism with a gear shifting shaft of a motor vehicle has a first actuator having a first control member moveable into various first switching positions and a second actuator having a second control member moveable into various second switching positions. One of the first and second actuators displaces the gear shifting shaft in the axial direction of the gear shifting shaft and the other of the first and second actuators rotates the gear shifting shaft. The first and second control members have axes positioned parallel to one another. A kinematic coupling device connects the first and second control members and the gear shifting shaft.

37 Claims, 12 Drawing Sheets

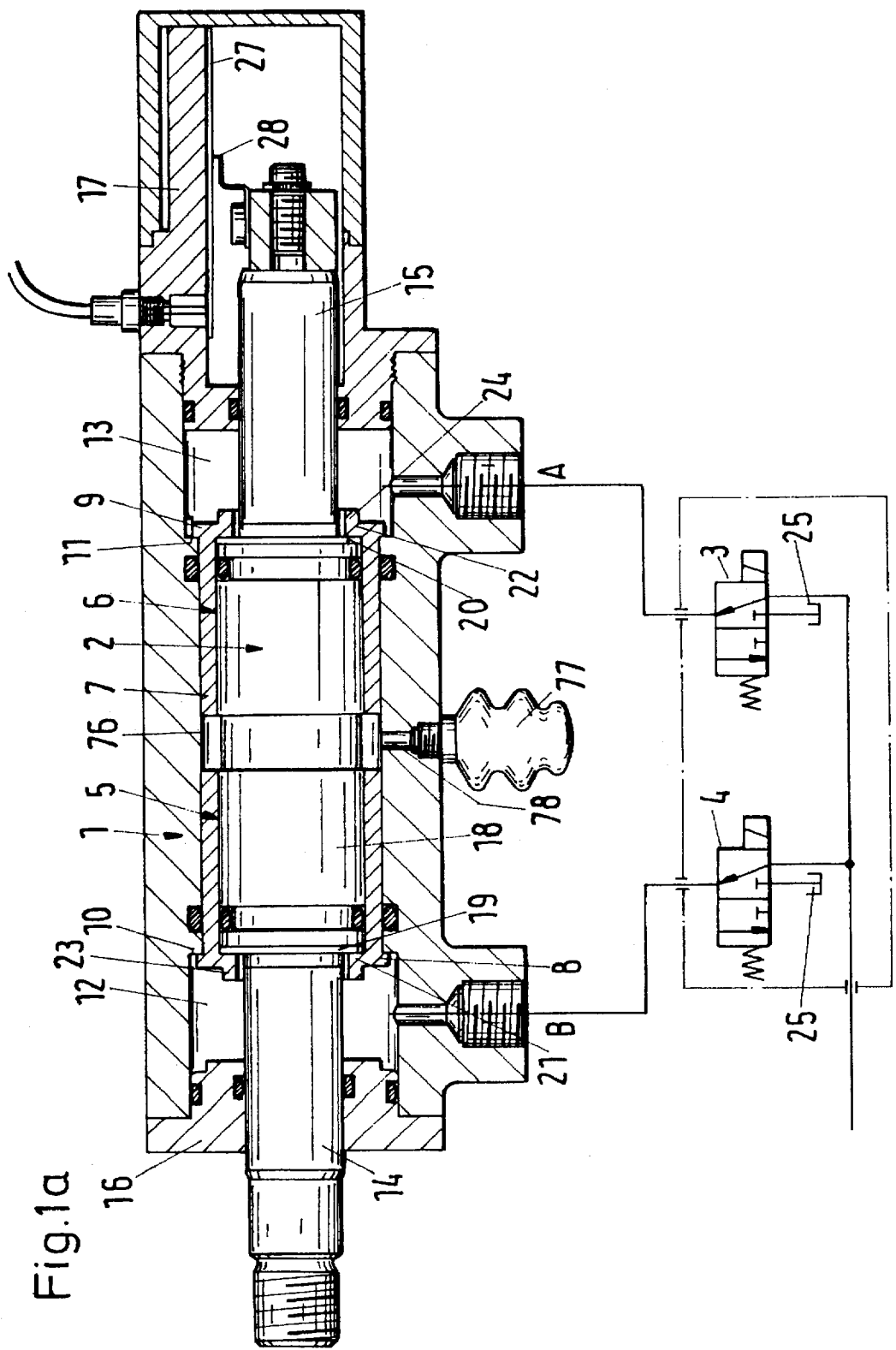

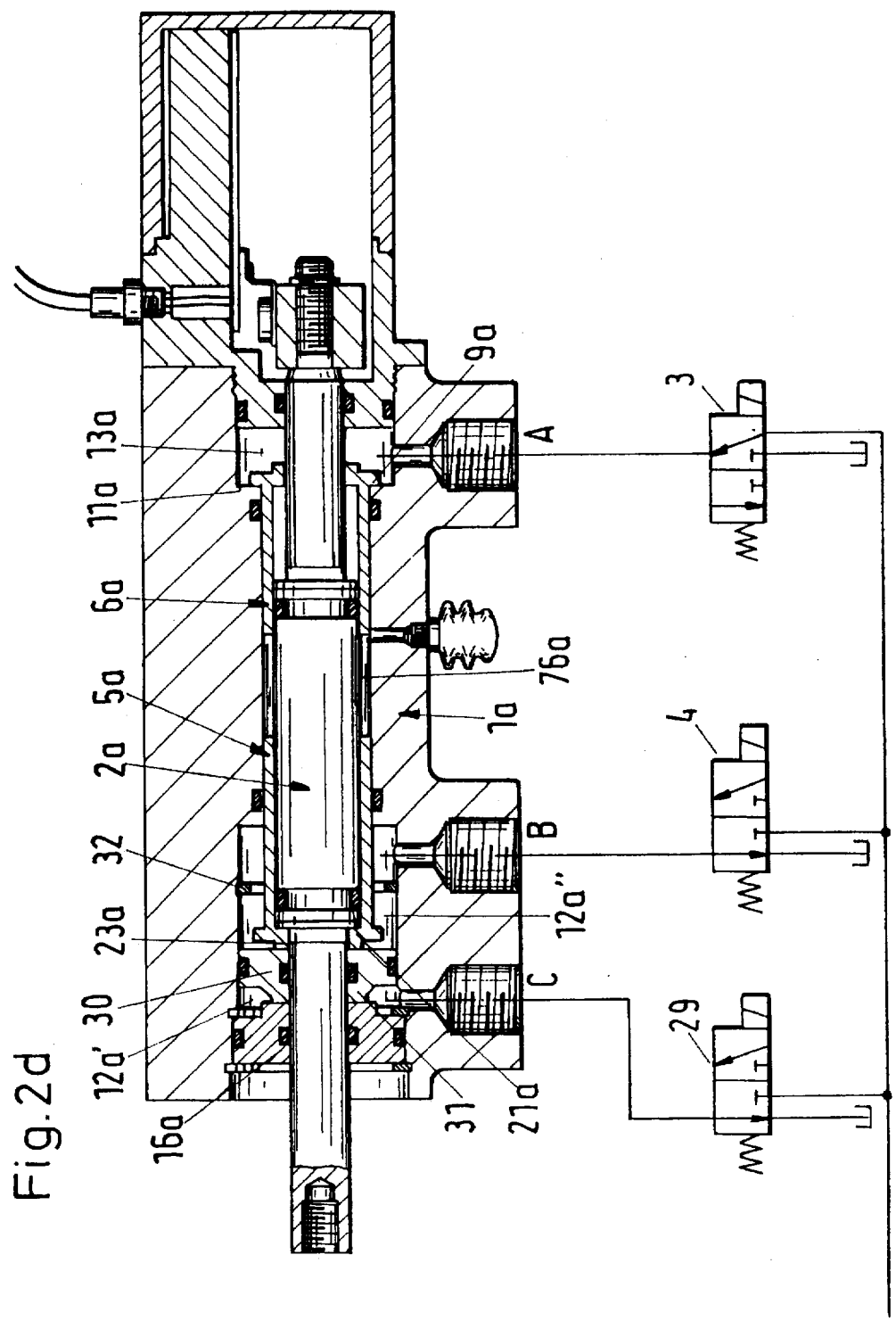

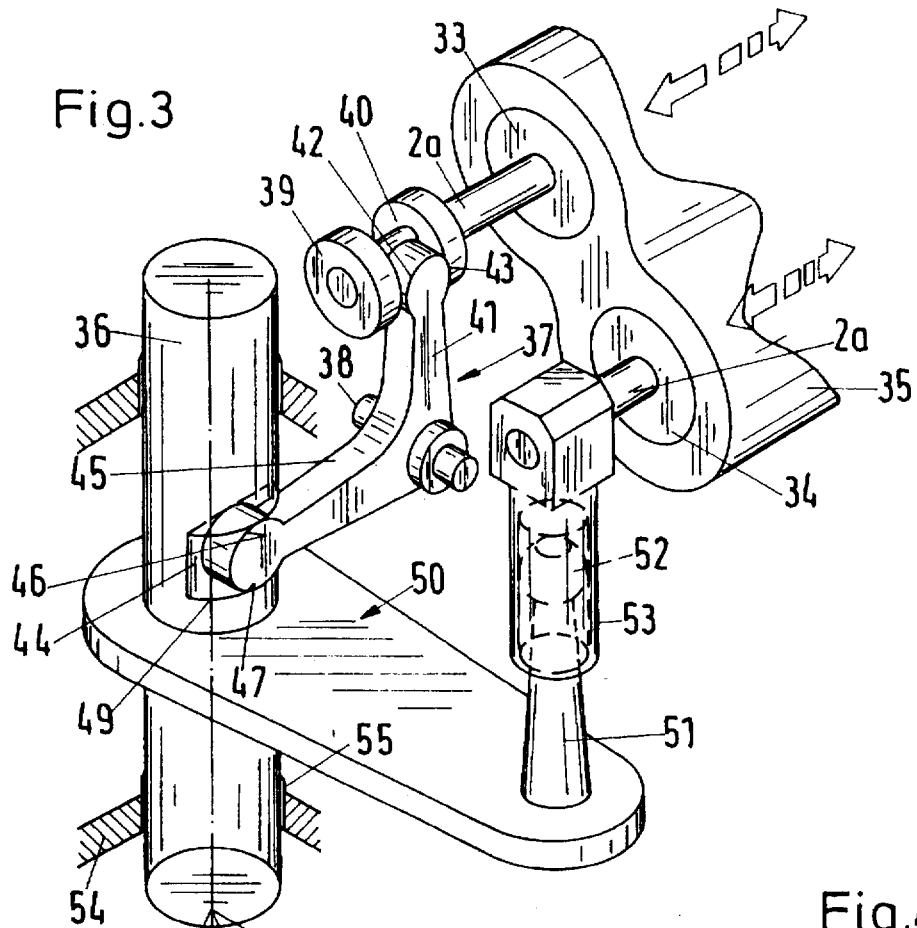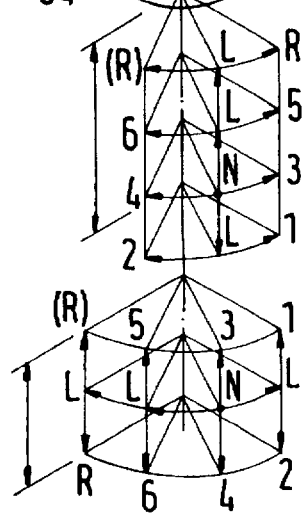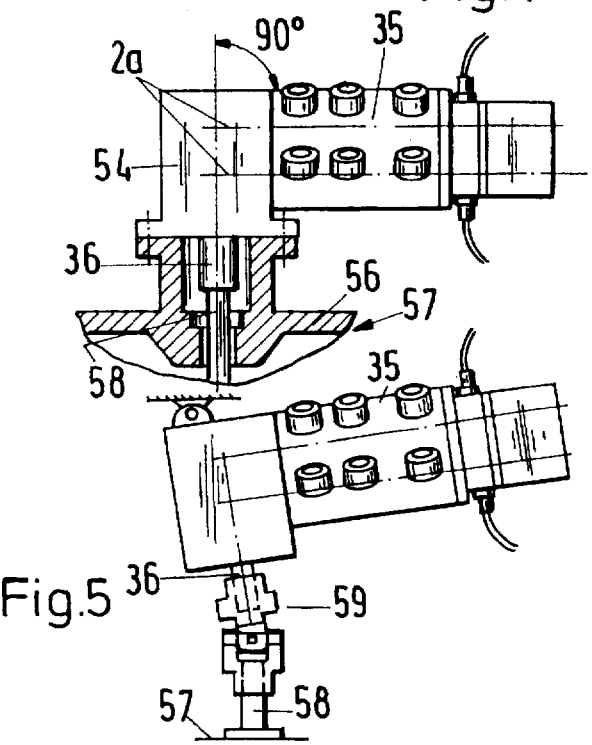

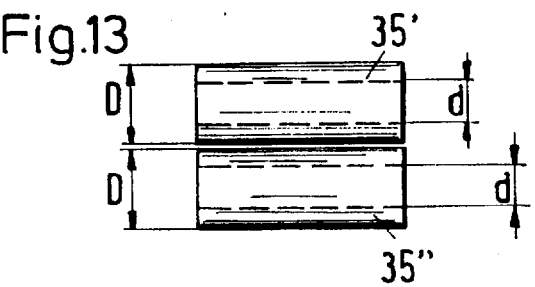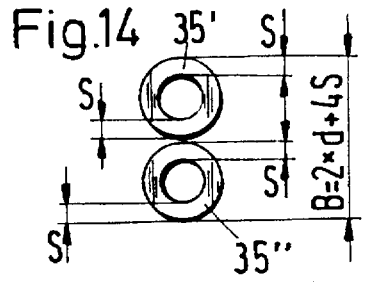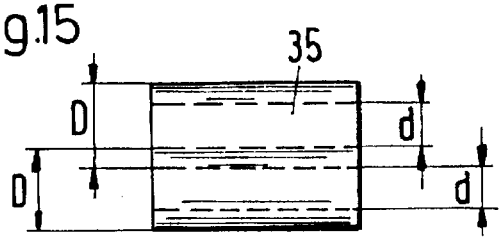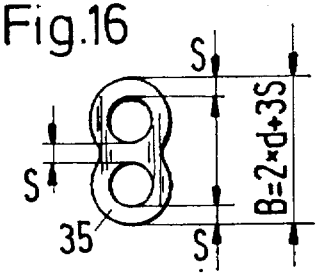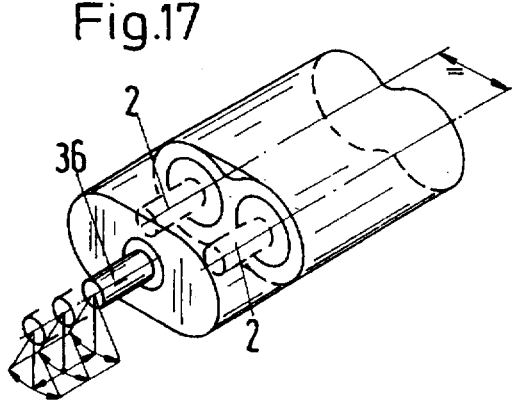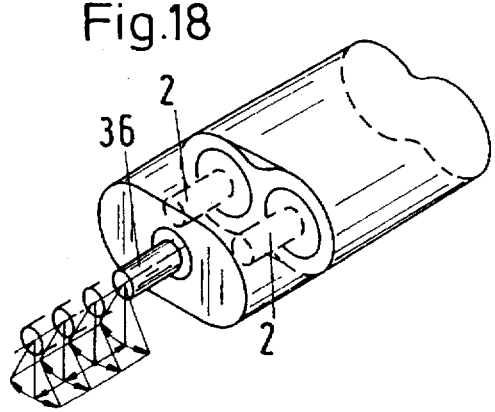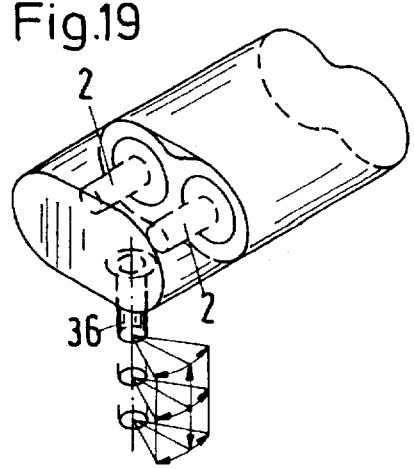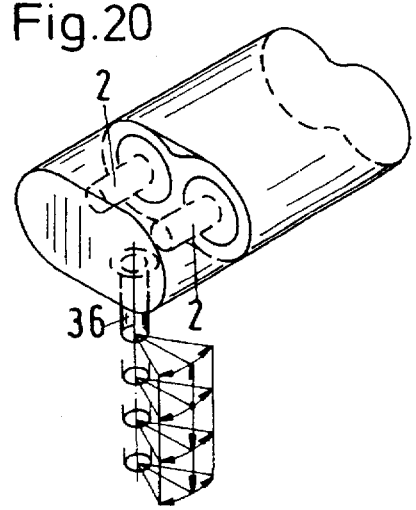

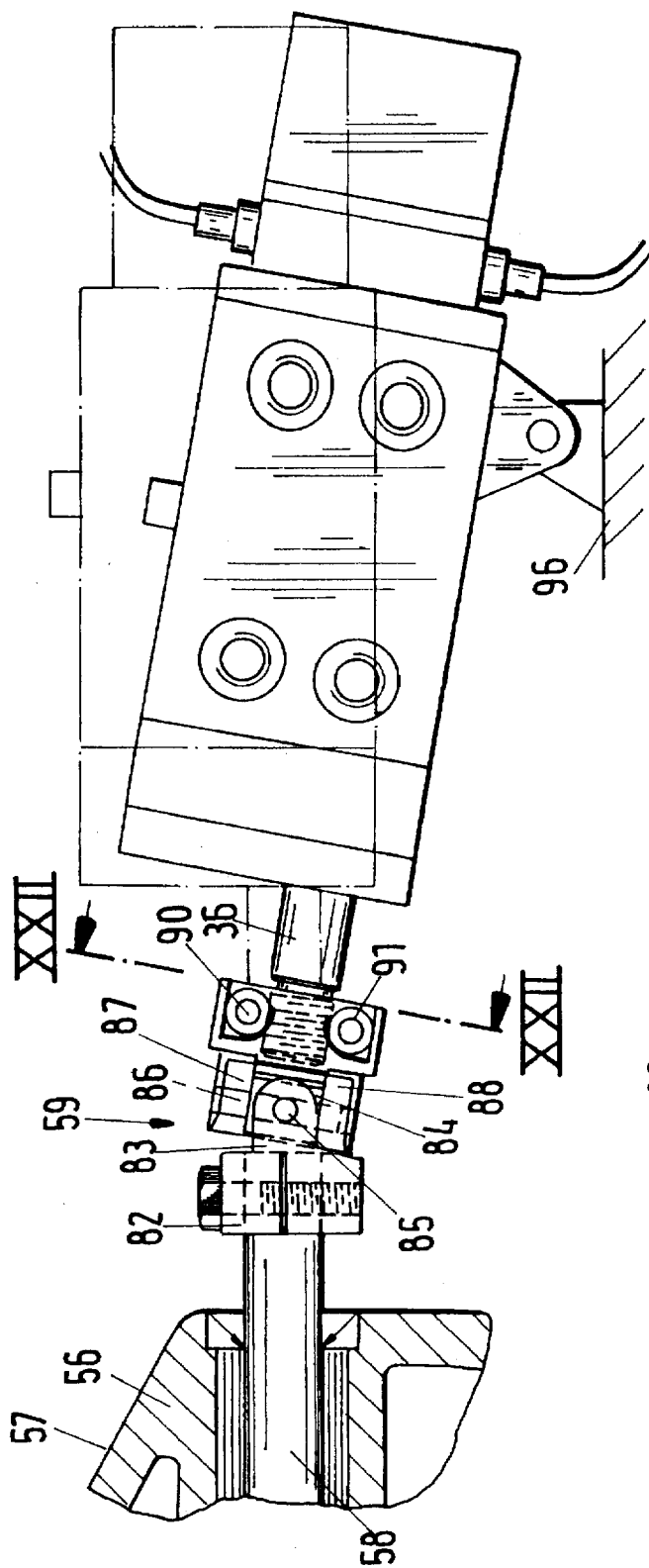

5,722,297

ACTUATOR SYSTEM FOR GEAR SHIFTING MECHANISMS OF MOTOR VEHICLES

BACKGROUND OF THE INVENTION

The invention relates to an actuator system for gear shifting mechanism of motor vehicles.

In motor vehicles the gears are shifted with a gear shift lever to be operated manually. Automatic gear shifting mechanisms are also know which, however, have a different constructive embodiment than manual gear shifting mechanisms. Therefore, two different gear shifting mechanisms must be manufactured and mounted. For both gear shifting mechanism types spare parts must be kept in storage.

With the actuator system of the aforementioned kind only one gear shifting mechanism design is required for a manual as well as for an automatic gear shifting mechanism. With the two actuators the shifting paths and the gears of the gear shifting mechanism are shifted. The actuators are positioned perpendicular to one another and thus require a correspondingly large mounting space. This actuator system therefore can only be mounted where correspondingly large mounting space is available.

SUMMARY OF THE INVENTION

It is therefore an object of the invention to embody the aforementioned actuator system such that it has a compact constructive design and requires only minimal mounting space.

This object is inventively solved for the aforementioned actuator system by the following features:
- a first actuator having a first control member moveable into various first switching positions;
- a second actuator having a second control member moveable into various second switching positions;
- one of said first and second actuators displaces the gear shifting shaft in the axial direction of the gear shifting shaft and the other of said first and second actuators rotates the gear shifting shaft;
- said first and said second control members have axes positioned parallel to one another;
- a kinematic coupling device connecting said first and said second control members and the gear shifting shaft.

In the inventive actuator system the two actuators are positioned parallel to one another so that a very compact constructive design results. The inventive actuator system thus can also be mounted where only small mounting space is available. Via the coupling device the control members of the two actuators are coupled with one another such that the movements for selecting the shifting path and the gear of the gear shifting mechanism is transmitted onto the gear shifting shaft of the gear shifting mechanism. For the two actuators only one single gear shifting shaft of the gear shifting mechanism is required. The two cooperating actuators replace the gear shifting lever provided for manual gear shifting mechanisms in motor vehicles and the corresponding gear shifting linkage.

Preferably, the coupling device comprises an angular lever with two angularly positioned arms, wherein the angular lever is pivotable about a pivot axis and wherein the pivot axis is positioned angularly to the axes of the first and the second control members.

The two arms are expediently positioned at a right angle to one another and the pivot axis is positioned at a right angle to the axes of the first and second control members.

In a preferred embodiment of the invention, the two arms are coupled to the control members.

One of the two arms advantageously has a longitudinal axis and is connected to the angular lever so as to be rotatable about the longitudinal axis.

The actuator system further may comprise a follower connected to the first control member, wherein the follower has an opening through which the one of the two arms extends.

Expediently, the other of the two arms has a longitudinal axis and is connected to the angular lever so as to be axially displaceable in a direction of the longitudinal axis.

Expediently, the other of the two arms is pivotably connected to the second control member.

Advantageously, the actuator system further comprises a bolt fixedly connected to the second control member, wherein the bolt extends parallel to the pivot axis of the angular piece and wherein the other of the two arms is pivotably supported at the bolt.

The actuator system may also further comprise a fork member with two legs fixedly connected to the second control member, wherein the bolt is fastened to the two legs.

Preferably, the first control member is coupled to the gear shifting shaft.

One of the two arms is pivotably connected to the first control member.

The first control member has two followers spaced apart from one another in an axial direction of the first control member and a free end of the one of the two arms is positioned between the followers.

The followers are annular collars.

The free end of the one of the two arms has curved surfaces and the followers have facing sides, wherein the curved surfaces rest at the facing sides of the followers.

The actuator system further comprises a shaft, wherein the other of the two arms is coupled to the shaft.

The shaft preferably extends perpendicular to the first and second control members.

The shaft may extend perpendicular to the pivot axis.

The other of the two arms is pivotably connected to the shaft.

The shaft expediently comprises a recess and the other of the two arms engages the recess.

The recess has two oppositely positioned walls spaced from one another in the axial direction of the shaft and the other of the two arms rests at the oppositely positioned walls.

The other of the two arms has curved surfaces wherein the curved surfaces rests at the oppositely positioned walls of the recess.

The shaft is pivotably connected to the second control member.

The shaft is axially displaceable relative to the first and second control members.

The second control member in an axial direction thereof is positive-lockingly connected to the shaft.

The second control member comprises a bushing extending at a right angle to the axis of the control member, wherein the bushing has an axis extending parallel to an axis of the shaft.

The actuator system may further comprise a follower fixedly connected to the shaft and extending into the bushing.

The follower comprises a ball resting in any switching position of the shaft at an inner wall of the bushing.

The follower preferably further comprises a plate fixedly connected to the shaft and radially extending therefrom, wherein the follower is connected to the plate.

The shaft is the gear shifting shaft.

In the alternative, the shaft is coupled to the gear shifting shaft.

Each one of the first and second control members has a longitudinal axis and is rotatable about the longitudinal axis.

The gear shifting shaft is positioned angularly to the first and second control members.

The gear shifting shaft is positioned perpendicular to the first and second control members.

The gear shifting shaft is positioned parallel to the first and second control members.

The actuator system may further comprise a universal joint for coupling the kinematic coupling device to the gear shifting shaft.

The universal joint comprises a first fork member fixedly connected to the shaft and a second fork member connected to the gear shifting shaft.

The first fork member is clamped with at least one clamping screw to the shaft.

The first fork member has at least one slot extending over a portion of its length and the at least one clamping screw extends perpendicular to the slot.

The actuator system further may comprise a common housing, wherein the first and second control members are positioned in the common housing.

BRIEF DESCRIPTION OF THE DRAWINGS

The invention will be explained in detail with the aid of some embodiments represented in the drawings. It is shown in:

FIG. 1a to FIG. 1c respectively a longitudinal section of the inventive actuator system in different shifting positions, FIG. 2a to FIG. 2d in longitudinal section different gear shifting positions of a further embodiment of an inventive actuator system, FIG. 3 in a perspective representation two actuators coupled with one another by a gear shifting shaft of a gear shifting mechanism of a motor vehicles, FIG. 4 and FIG. 5 show respectively in a schematic representation two actuators in a common housing which are connected with the gear shifting shaft of a gear shifting mechanism, FIG. 6 in a representation corresponding to FIG. 3 two actuators according to FIG. 2 which are connected to the gear shifting shaft of a gear shifting mechanism of a motor vehicle, FIG. 7 and FIG. 8 corresponding to the representations of FIGS. 4 and 5 the connection of two actuators arranged in a common housing with the gear shifting shaft of a motor vehicle gear shifting mechanism, FIG. 9 to FIG. 20 respectively in a schematic representation different embodiments of housings in which respectively two actuators are arranged parallel to one another, FIG. 21 partly in an end view and partly in section the coupling of an actuator system comprised of two actuators with the gear shifting shaft of a gear shifting mechanism with the aid of a universal joint, FIG. 22 a section along the line XXII—XXII in FIG. 21.

DESCRIPTION OF PREFERRED EMBODIMENTS

Figure 1B:
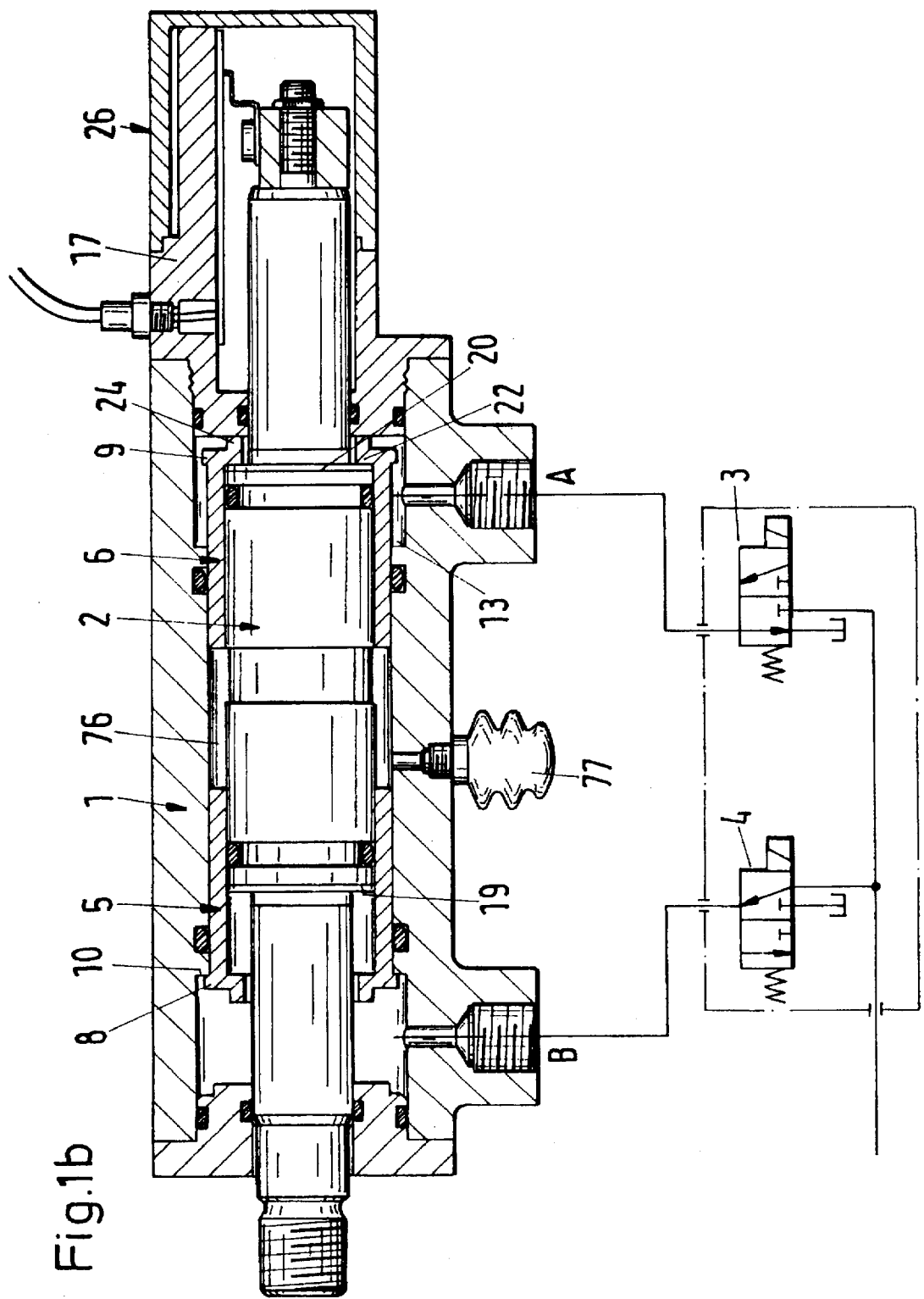

The actuator systems to be described in the following serve to shift the gear shifting shafts of gear shifting mechanisms of motor vehicles. All actuators are linear drives in which a piston rod is axially displaced in order to displace and rotate the gear shifting shaft of the gear shifting mechanism.

The actuator according to FIG. 1 has a housing 1 in which a piston 2 is axially displaceably mounted. The housing 1 has two connectors A and B to which are connected respectively a directional control valve 3 and 4. Auxiliary pistons 5 and 6 in the form of sleeves are seated on the piston 2 and mounted within an axial bore 7 of the housing. The two auxiliary pistons 5, 6 are sealed relative to the piston 2 and the housing 1.

The two auxiliary pistons 5, 6 are arranged mirror-symmetrically to one another and have an outer circumferential flange 8, 9 with which in the center position represented in FIG. 1a they rest at a shoulder 10, 11 of the housing 1. Via these shoulders 10, 11 the axial bore 7 has a transition into a respective pressure chamber 12 and 13 penetrated by piston sections 14 and 15 (piston rods) of the piston 2 which have a reduced diameter. The pressure chamber 12 is outwardly delimited by a lid 16 through which the piston rod 14 extends outwardly in a sealed manner. The oppositely arranged pressure chamber 13 is closed off by the end face of a potentiometer housing 17. The piston rod 15 extends in a sealed manner through this housing end face. The pressure chambers 12, 13 are connected to the connectors A and B and are supplied with hydraulic medium in a manner which will be described in the following.

Between the piston rods 14, 15 and the central piston section 8 having a greater diameter radially outwardly extending annular shoulders 19 and 20 are formed. These annular shoulders 19, 20 serve as follower surfaces for radially inwardly oriented annular flanges 21, 22 of the auxiliary pistons 5, 6. They are positioned at the same level as the radially outwardly oriented flanges 8 and 9 and have a transition into ring members 23 and 24 surrounding the piston rods 14, 15 at a distance.

With the directional control valves 3, 4 the piston 2 can be displaced into three different axial positions. When both directional control valves 3, 4 are switched into the position according to FIG. 1a, the hydraulic medium can flow from the hydraulic medium source via the connectors A and B into the pressure chambers 12, 13. The auxiliary pistons 5, 6 are displaced relative to one another to such an extent that their flanges 8, 9 rest at the shoulders 10, 11 of the housing 1. Via the annular gap between the ring members 23, 24 and the piston rods 14, 15 the hydraulic medium flows also to the annular shoulders 19, 20 of the piston 2 which have identical surface areas. Since the auxiliary pistons 5, 6 are supported with their flanges 8, 9 at the housing shoulders 10, 11, the auxiliary pistons themselves must not take up any forces. Thus, the auxiliary pistons 5, 6 can be embodied with very thin walls so that the actuator can have a very compact construction. The wall thickness of the auxiliary pistons 5, 6 is, for example, only approximately 1 mm.

The axial length of the piston 2 can, when very high finishing tolerances are to be maintained, be identical to the distance between the annular flanges 21, 22 of the auxiliary pistons 5, 6 when supported at the housing. In this case the central position of the piston 2 is determined by the auxiliary pistons 5, 6 supported at the housing.

However, the axial length of the piston 2 however, for example, based on manufacturing tolerances, can be smaller than the distance of the annular flanges 21, 22 of the auxiliary pistons 5, 6 when they are supported at the housing. The piston 2 in this case can be displaced at most to such an extent that one of the two annular shoulders 19, 20 comes to rest under the effect of external force at one of the two ring flanges 21, 22 of the auxiliary piston 5, 6. In this instant a portion of the annular shoulder 19 or 20 is covered by the annular flange 21 or 22 of the auxiliary piston 5 or 6 so that the active surface area of the annular shoulder 19 or 20, which can be loaded by the hydraulic medium, is smaller than that of the oppositely arranged annular shoulder which in this case is not covered by the corresponding annular flange of the auxiliary piston. Due to this difference in surface area the piston 2, by application of an external force, can thus be displaced maximally to the abutment of one of the respective annular shoulders 19 or 20 at the auxiliary piston 5 or 6.

If the axial length of the piston 2 is greater than the distance between the shoulders 10, 11 of the housing 1, the piston 2 together with the respective auxiliary piston 5 or 6 can be displaced to a maximum extent such that the respective auxiliary piston with outwardly extending flange 8 or 9 rests at the housing shoulder 10 or 11.

In all of the disclosed possibilities it is presupposed that the abutment surface of the radially outwardly extending flanges 8, 9 and the radially inwardly extending annular flanges 21, 22 of the auxiliary pistons 5, 6 are positioned in a respective common radial plane. In this disclosed manner, the piston 2, depending on the aforementioned tolerances of the auxiliary pistons 5, 6, the piston 2 and the housing 1, can be displaced into a position which in the following will be defined as the center position. This center position can deviate by the respective tolerance value from the theoretical center position.

When the directional control valve 3 is switched such that the pressure chamber 13 is opened in the direction of the tank 25, the hydraulic pressure acting on the annular shoulder 20 of the piston 2 is smaller than the hydraulic system pressure acting on the annular shoulder 19. Thus, the piston 2 in FIG. 1 is displaced to the right into the position represented in FIG. 1b. The annular shoulder 20 of the piston 2 comes to rest at the annular flange 22 of the auxiliary piston 6 and thus entrains it. The other auxiliary piston 5 remains with its flange 8 in abutment at the shoulder 10 of the housing 1. Due to the smallest possible surface area to be loaded by the hydraulic medium, the gear shifting operation, which will be disclosed in the following, can be performed in an inexpensive manner because valves with smallest possible nominal width can be used. Especially, it is not necessary to use proportional pressure relief valves with return line for the shifting path selection.

Upon displacing the auxiliary piston 6, the annular chamber 76 surrounding the piston 2 is enlarged. This annular chamber 76 is in communication with an expansion bellows 77 via a bore 78 in the housing 1. Upon enlargement of the annular chamber 76 air is being sucked from the expansion bellows 77 so that the volume of the expansion bellows 77 is reduced. In this manner it is ensured that within the annular chamber 76 atmospheric pressure is maintained when the auxiliary piston 6 is in the position represented in FIG. 1b. In general, the annular chamber 76 could also be directly connected to the atmosphere. However, this would allow dirt particles, humidity etc. to enter the annular chamber 76 so that the operational reliability of the actuator would be impaired. These problems are reliably reduced by using the expansion bellows 77 in a very uncomplicated manner.

In order to reach the switching position of FIG. 1a from the previously disclosed switching position of FIG. 1b, the control valve 3 is switched so that the hydraulic medium within the pressure chamber 13 is pressurized. Since the auxiliary piston 6 is provided with the ring member 24, with which it rests at the end face of the potentiometer housing 17, annular flange 22 of the auxiliary piston 6 rests at a distance from the potentiometer housing 17. Thus, the hydraulic medium can load the annular flange 22 so that the piston 2 with the auxiliary piston 6 is returned into the position according to FIG. 1a. The air volume present within the annular chamber 76 is displaced upon return of the auxiliary piston 6 via the bore 78 into the expansion bellows 77.

When both directional control valves 3, 4 during this return are switched as shown in FIG. 1a, then the hydraulic medium in the pressure chamber 12 upon return of the piston 2 is displaced by the annular shoulder 19 of the piston 2 and returned via the directional control valves 3, 4 into the pressure chamber 13. Accordingly, the hydraulic medium source must supply only the remaining portion of the hydraulic medium which is required for displacing the auxiliary piston 6 loaded at the opposite side by the atmospheric pressure present within the annular chamber 76.

For the return of the piston 2 from the position according to FIG. 1b into the position according to FIG. 1a it is also possible to relieve the pressure chamber 12 to the tank 25 and to connect only the pressure chamber 13 with the hydraulic medium source. In this case, the piston 2 is displaced counter to the remaining pressure within the pressure chamber 12. The auxiliary piston 6 is entrained synchronously because it is loaded at the pressure chamber side with the system pressure and at the opposite side with atmospheric pressure. As long as the hydraulic medium in the pressure chamber 12 is under pressure, the auxiliary piston 5 is maintained in its abutment at the shoulder 10 of the housing 1.

Figure 1C:
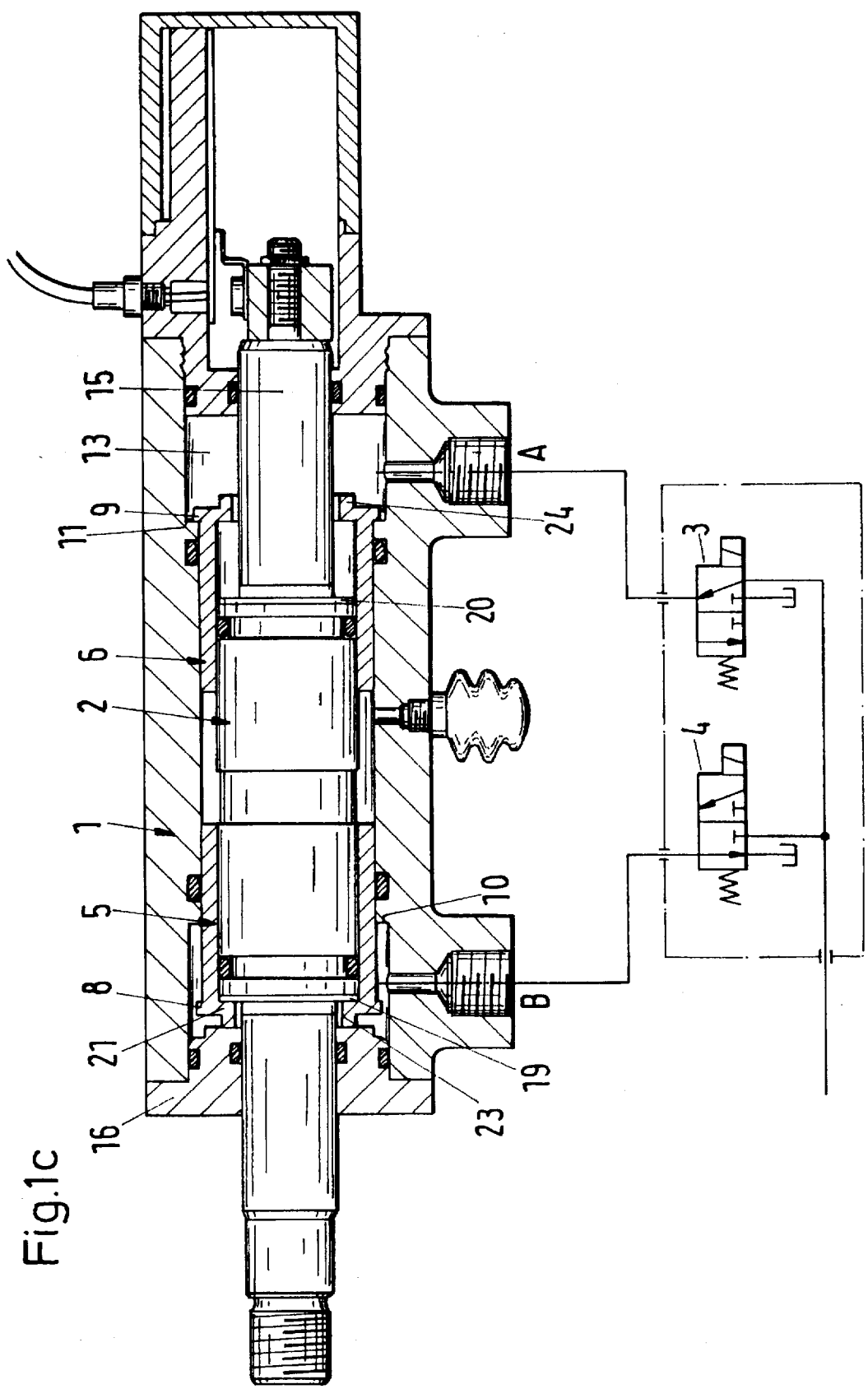

When the piston 2 is to be displaced from the position according to FIG. 1a into the third switching position represented in FIG. 1c, the directional control valve 4 is switched while the pressure within the pressure chamber 13 is maintained. The pressure chamber 12 is relieved so that the system pressure present within the pressure chamber 13 displaces the piston 2 to the left. The auxiliary piston 6 remains with its flange 9 in abutment at the shoulder 11 of the housing 1. Since the ring member 24 of the auxiliary piston 6 surrounds the piston rod 15 at a distance, the hydraulic medium within the pressure chamber 13 can reach the annular shoulder 20 of the piston 2 so that it is axially displaced. The piston 2 entrains via its annular shoulder 19 which comes into abutment at the annular flange 21 of the auxiliary piston 5, the auxiliary piston until it rests with the end face of its ring member 23 at the lid 16. Thus, the annular flange 21 has an axial distance from the lid 16.

The outer diameter of the annular flange 21, 22 of the auxiliary piston 5, 6 is smaller than the inner diameter of the pressure chambers 12, 13 so that it is ensured that the hydraulic medium can reach the respective end face of the annular flanges 21, 22. Upon displacement into the position according to FIG. 1c, the same conditions are present as have been explained in detail in connection with the displacement into the position according to FIG. 1b.

When it is desired to return the piston 2 into its center position according to FIG. 1a, the switching occurs in the same manner as disclosed for the return of the piston 2 from the position according to FIG. 1b into the center position. Therefore, reference can be made to the corresponding explanations in regard to FIG. 1b.

However, it is also possible to switch the directional control valve 3 such that the pressure chamber 13 is pressure-relieved. In this case, piston 2 is displaced from the switching position according to FIG. 1c into the switching position according to FIG. 1b. As soon as the auxiliary piston 5 with its flange 8 comes to rest at the shoulder 10 of the housing 1, the auxiliary piston 5 stops. At the same time, or shortly thereafter, the annular shoulder 20 of the piston 2 comes into abutment at the flange 22 of the auxiliary piston 6 that is thus entrained by the piston 2.

The respective control of the directional control valves 3, 4 is carried out in a manner known per se. Thus, the piston 2 can be displaced into the switching positions required for shifting the gear shifting mechanism of the motor vehicle.

The housing 17 contains a potentiometer 26 as a travel measuring system with which the respective position of the piston 2 can be detected and monitored in a simple manner. The potentiometer 26 has, in a manner known per se, at least one strip conductor 27 at which rests a slide 28 connected to the piston 2. Depending on the position of the slide 28 along the strip conductor 27, the respective position of the piston 2 can be detected. The design of a potentiometer is known and will thus not be explained in detail.

FIG. 2 shows an actuator system in which the piston 2a can be displaced axially into four different switching positions. The housing 1a has three connectors A, B, and C which are respectively connected to directional control valves 3, 4 and 29. Auxiliary pistons 5a and 6a are sealingly positioned on the piston 2a so as be axially displaceable. The auxiliary pistons are of the same design as disclosed in the previous embodiment. The piston 2a has piston rods 14a and 15a of a reduced diameter. A piston 30 is positioned on the piston rod 14a and is radially sealed relative thereto. It is also sealed at the inner wall of the pressure chamber 12a. The pressure chamber 12a is thus divided into two pressure subchambers 12a' and 12a" by the piston 30. The connector C opens into the pressure chamber 12a' and the connector B opens into the pressure chamber 12a".

Figure 2A:
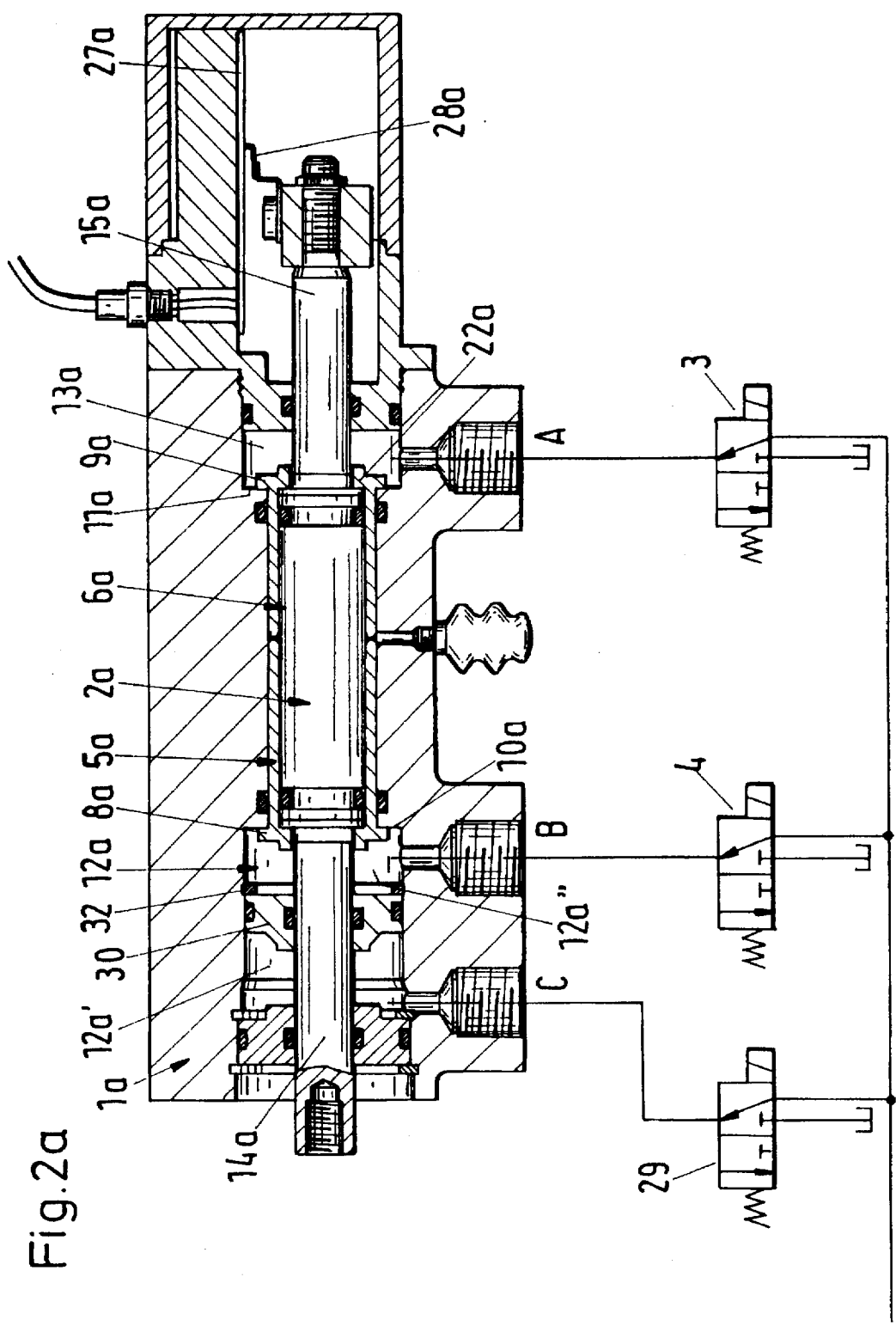

In the switching position according to FIG. 2a the piston 2a is in its center position. The two auxiliary pistons 5a and 6a rest with their radially outwardly oriented flanges 8a and 9a at the radially inwardly oriented shoulders 10a, 11a of the housing 1a. The directional valves 3, 4, 29 are switched such that the hydraulic medium in the pressure chambers 12a', 12a" and in the pressure chamber 13a are respectively pressurized. Thus, the piston 30 remains in the central position represented in FIG. 2a, which has been explained in connection with FIG. 1a supra.

Figure 2B:
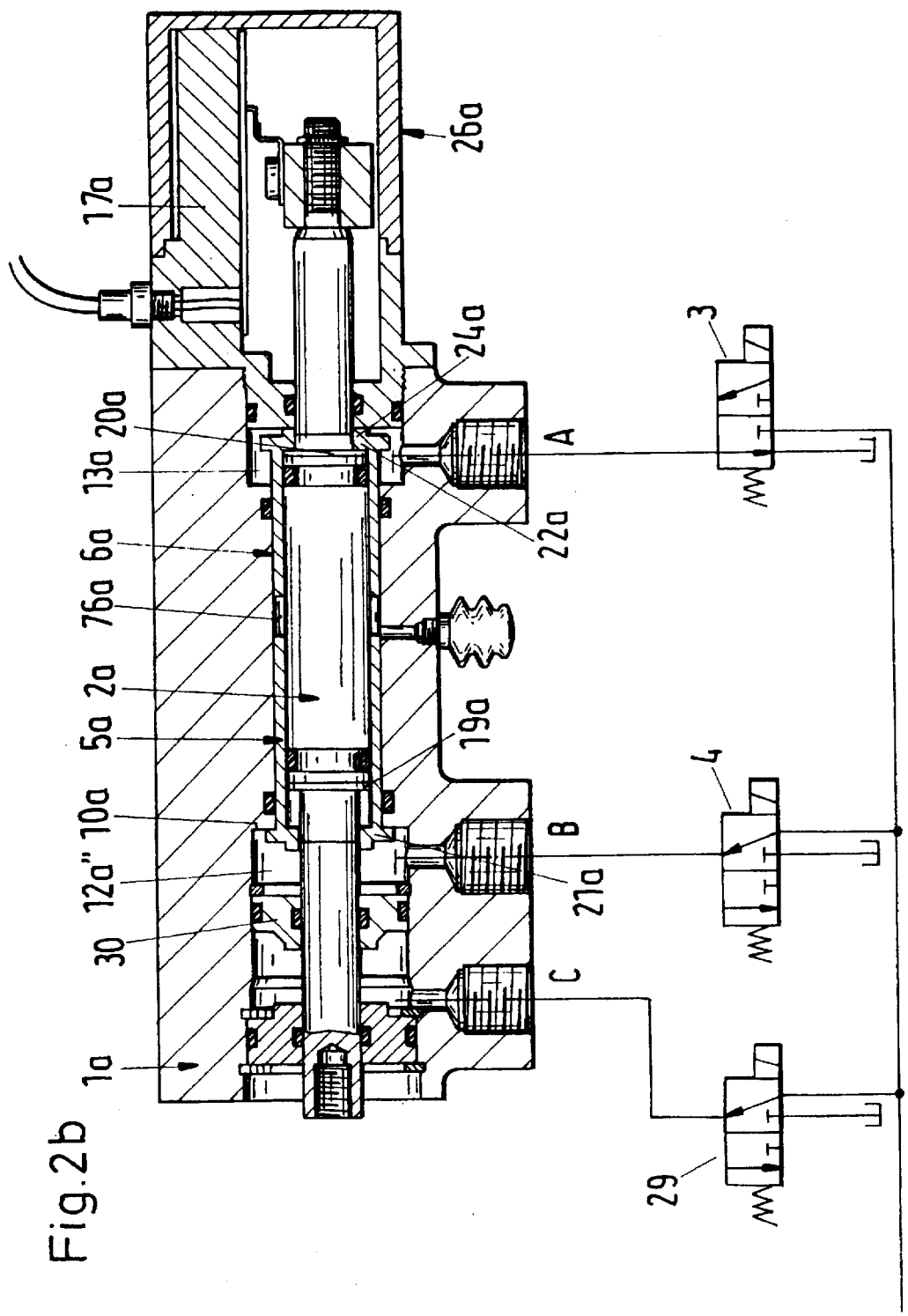

In order to displace the piston 2a into the switching position according to FIG. 2b, the pressure chamber 13a is relieved by switching the directional control valve 3. The piston 2a and the auxiliary piston 6a are then, as has been explained in detail with the aid of FIG. 1, into the position according to FIG. 2b. Since the two directional control valves 4, 29 remain in the switching position according to FIG. 2a, at both sides of the piston 30 the system pressure is present. The piston 30 thus remains in its abutment position in which it rests at an abutment 32 of the housing 1a. Upon displacement of the piston 2a an axially acting frictional force occurs between the piston rod 14a and the piston 30 due to the intermediately positioned seal so that the piston 30 is additional pressed against the abutment 32. The auxiliary piston 5a remains in its abutment position due to the pressure present within the pressure chamber 12a" because in the annular chamber 76a atmospheric pressure is present. The auxiliary piston 5a rests with its radially outwardly oriented annular flange 8a at the radially inwardly oriented shoulder 10a of the housing 1a.

Figure 2C:
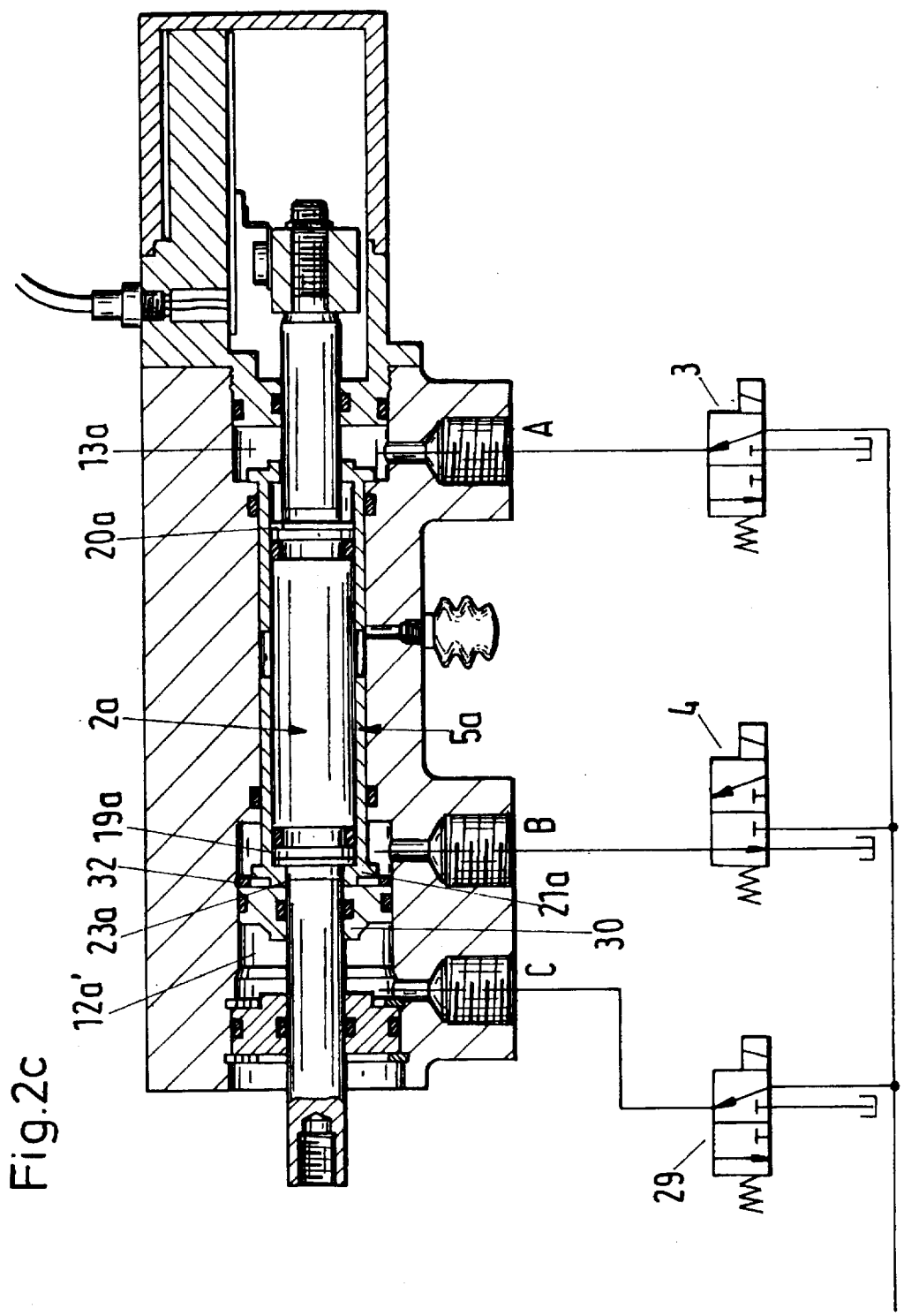

When it is desired to displace the piston 2a from the position of FIG. 2a into a third switching position according to FIG. 2c, the directional control valve 4 is switched and the pressure chamber 12a" is thus relieved. The two other directional control valves 3 and 29 remain in their switching position according to FIG. 2a so that the hydraulic medium in the pressure chamber 12a' and in the pressure chamber 13a is pressurized. The piston 2a with the auxiliary piston 5a is then, as has been described in connection with FIG. 1, displaced to the left in FIG. 2 until it reaches the position according to FIG. 2c. The piston 2a is displaced axially to such an extent until the ring member 23a of the auxiliary piston 5a comes to rest at the piston 30. Since the piston 30 is loaded at the side facing the pressure chamber 12a' with the system pressure and since this piston side is larger than the loaded annular shoulder 20a of the piston 2a, the piston 30 cannot be displaced by the piston 2a. The piston 30 serves thus in this third switching position of the piston 2a as an abutment for the auxiliary piston 5a and the piston 2a.

When the piston 2a is to be displaced from the position according to FIG. 2b into the switching position according to FIG. 2c, the directional control valve 3 must be switched into the switching position according to FIG. 2a while the directional control valve 4 is switched such that the pressure chamber 12a" is relieved. Then the piston with the auxiliary piston 6a is displaced in the manner disclosed above in one movement into the switching position according to FIG. 2c.

In order to displace the piston 2a from the center position according to FIG. 2a into a fourth switching position according to FIG. 2d, the directional control valves 29 and 4 are switched such that the pressure chambers 12a' and 12a" are relieved. The control valve 3 is switched such that the hydraulic medium in the pressure chamber 13a is pressurized. The piston 2a is displaced to the left together with the auxiliary piston 5a, as has been explained in connection with FIG. 1. Since the pressure chamber 12a' is relieved and the pressure chamber 12a" is subjected to the system pressure, simultaneously to the displacement of the piston 2a the piston 30 is also displaced to the left until it comes to rest at the lid 16a.

The projection 31 actually projects past the side of the piston 30 facing the lid 16a whereby the piston 30 rests at the lid 16a with the planar end face of this projection. The projection 31 has a smaller outer diameter than the other part of the piston 30. Thus, the hydraulic medium which is introduced via the connector C can still reach the side of the piston 30 facing the lid 16a.

The auxiliary piston 6a remains, due to the pressure within the pressure chamber 13a and the atmospheric pressure within the annular chamber 76a, with its radially outwardly oriented flange 9a in abutment at the radially inwardly oriented shoulder 11a of the housing 1a.

When the piston 2a is to be displaced from the position according to FIG. 2d into the switching position according to FIG. 2c, the valve 29 is switched such that in the pressure chamber 12a' pressure is built up. The control valve 4 is switched such that the pressure chamber 12a" is relieved. Due to the pressure within the pressure chamber 12a', the piston 30 is displaced to the right until it abuts the abutment 32. This abutment 32 is, for example, formed by a securing ring which is inserted into an annular groove at the wall of the pressure chamber 12a". Since the auxiliary piston 5a rests with its ring member 23a at the piston 30, the auxiliary piston 5a and thus also the piston 2a is displaced to the right until it reaches the switching position of FIG. 2c in which the piston 30 rests at the abutment 32. The outer diameter of the radially outwardly oriented flange 8a of the auxiliary piston 5a is smaller than the inner diameter of the abutment 32 so that the auxiliary piston is displaced past the abutment 32.

The piston rod 15a projects, as in the previous embodiment, into the housing 17a of the travel measuring system 26a. This is advantageously in the form of a potentiometer and has at least one strip conductor 27a at which the slide 28a of the piston 2a rests.

In order to be able to shift the various gears in a gear shifting mechanism with central gear shifting shaft of a motor vehicle, two actuators are combined one of which serves to select the shifting path and the other serves to select the gear.

In the embodiment according to FIG. 3, two actuators 33 and 34 are positioned parallel to one another in a common housing 35.

The two actuators 33, 34 are embodied according to the embodiment of FIG. 2 so that with them four different switching positions can be realized. Since the two actuators 33, 34 are positioned parallel to one another, an extremely compact design results so that this actuator system can be positioned within a motor vehicle in a space-saving manner. This actuator system is suitable in all situations where only a minimal mounting space is available.

The two pistons 2a of the actuators 33, 34 project from the housing 35. The two actuators 33, 34 act on a common shaft 36 that is coupled with the gear shifting shaft of the gear shifting mechanism not represented in FIG. 3. The actuator 33 serves to axially displace the shaft 36 for the respective selection of the shifting path while the actuator 34 serves to rotate the shaft 36 in the respectively selected shifting path in order to thus select the gears. This is schematically represented in FIG. 3 with a corresponding diagram.

The connection of the piston 2a with the shaft 36 is realized with an angular lever 37 which is supported to be pivotable about an axis 38 which is perpendicular to the axes of the pistons 2a and to the axis of the shaft 36. One of the pistons 2a is provided at one of the ends external to the housing 35 with two annular collars 39 and 40 which are axially spaced relative to one another, have a circular contour, and between which the free end of the one arm 41 of the angular lever 37 engages. The free end of this arm 41 is so wide that it corresponds to the distance between the two annular collars 39 and 40. The oppositely arranged sides 42 and 43 with which the arm 41 rests at the facing inner sides of the annular collars 39, 40 are curved in the shape of a circular segment.

The shaft 36 has a recess 44 engaged by the free end of the other arm 45 of the angular lever 37. The arm 45 rests with the curved sides 46 and 47 in the shape of a circular segment at the axially oppositely arranged walls 48 and 49 of the recess 44. Due to the curved sides 42, 43 and 46, 47 in the shape of a circular arc the free ends of the arms 41, 45 of the angular lever 37 upon its pivoting movement can perform a gliding movement at the annular collars 39, 40 as well as the walls 48, 49 with linear guidance so that the piston 2a and the shaft 36 are reliably axially displaceable. The pivoting movement of the angular lever 36 results in a relative movement between the free ends of the arms 41, 45 of the angular lever 37 and the annular collars 39, 40 as well as the walls 48, 49 of the recess 44.

The free ends of the arms 41, 45 of the angular lever 37 can also be of a spherical shape in another non-represented embodiment. The free ends of the arm rest then only with point contact at the annular collars 39, 40 and the walls 48, 49 of the recess 44.

A lever-shaped plate 50 is fixedly connected to the shaft 36 so as to be non-displaceable in the axial direction. It projects from the shaft 36 and carries at its free end a follower 51. The follower 51 extends perpendicular to the plate 50 and extends parallel to the shaft 36. The follower 51 carries at its free end a ball 52 which rests in a bushing 53 that is rotatably supported at the free end of the other piston 2a. The bushing 53 extends perpendicular to the piston 2a and opens in the direction toward the plate 50. The ball 52 rests at the inner wall of the bushing 53.

The piston 2a coupled with the angular lever 37 serves to select the different shifting paths of the gear shifting mechanism. For this selection of the shifting paths the piston 2a at the bushing is in its center position as has been explained in connection with FIGS. 1a and 2a. The piston 2a at the angular lever, as has been explained in detail in connection with FIG. 2, is axially displaced into the respective position for selecting the shifting path. For this purpose, the angular lever 37, due to coupling of the arm 41 with the piston 2a, is pivoted about the axis 38. This results in the shaft 36 being correspondingly axially displaced by the angular lever arm 45. The plate 50 with the follower 51 is entrained accordingly in the axial direction of the shaft 36 whereby the ball 52 within the bushing 53 is axially displaced relative thereto. The bushing 53 is, of course, of such a length that in any switching position of the piston 2a the ball 52 remains within the bushing 53. Furthermore, the bushing 53 is designed such that the ball 52 does not rest at the bottom of the bushing when the piston 2a is moved farthest inwardly and the shaft 36 is correspondingly moved farthest upwardly, relative to the representation of FIG. 3.

The piston 2a at the bushing is also axially displaced into the respectively required switching position after selection of the shifting path. For this purpose, the shaft 36, via the plate 50 and the follower 51, is rotated about its axis and the corresponding gear is selected. Since the ball 52 only has a point contact with the inner wall of the bushing 53, such a pivoting movement is easily possible. For this pivoting movement the bushing 53 is pivoted relative to the piston 2a. It is also possible, to fixedly connect the bushing 53 to the piston 2a so that in this case the piston 2a is also rotated about its axis. In order to prevent that upon rotation of the shifting shaft 36 the free end of the angular lever arm 45 comes into contact with the axially extending bottom of the recess 44, the free end of the arm is arranged within the recess 44, respectively, the recess is designed such that in any rotational position of the shaft 36 a contact between the free end of the arm and the bottom of the recess 44 is prevented. In the same manner, the follower 51 in its diameter is designed such that a contacting with the bushing 53 is prevented. The follower 51 for this reason is preferably of a conically tapering shape.

In FIG. 3 the upper diagram shows the shifting paths of the gear shifting mechanism as well as the respective gears. The selection of the shifting paths is carried out by a linear displacement of the shaft 36 while the selection of the gears takes place by a rotation of the shaft 36.

As can be seen in the lower switching diagram of FIG. 3, it is also possible with the disclosed actuator system to perform the selection of the shifting paths by a rotational movement of the shaft 36 and to select the gears by linear displacement of the shaft 36. This depends on the construction of the respective gear shifting mechanism. In this case, the axial displacement of the piston 2a at the bushing is rotated for selecting the shifting path so that the shaft 36 is rotated about its axis. The piston 2a at the angular lever is in its center position according to FIG. 1a, respectively FIG. 2a. Subsequently, by axial displacement of the piston 2a at the angular lever the desired gear is selected.

The disclosed kinematic coupling connection of the two pistons 2a of the actuator system is positioned in a schematically shown housing 54 in FIG. 3 to which is connected the housing 35. The shaft 36 projects through an opening 55 into this housing 54.

In the represented embodiment the shaft 36 is an intermediate shaft which is, in turn, connected to the gear shifting shaft of the gear shifting mechanism. Such an embodiment is shown schematically in FIG. 4. The housing 35 contains the two non-represented pistons 2a which are kinematically coupled within the housing 54. The shaft 36 is positioned in the embodiment of FIG. 3 at a right angle to the axes of the pistons 2a and extends from the housing 54. The housing 54 is connected to a housing 56 of the gear shifting mechanism 57. Its gear shifting shaft 58 is directly connected to the shaft 36.

The shaft 36 may also be the gear shifting shaft of the gear shifting mechanism. An intermediate shaft is then no longer required. The kinematic coupling device in this case operates directly with the gear shifting shaft.

FIG. 5 shows an embodiment in which the shaft 36 is coupled with a universal joint 59 to the gear shifting shaft 58 of the gear shifting mechanism 57. Due to the universal joint 59 the shaft 36 can be positioned at an angle relative to the gear shifting shaft 58. In the represented embodiment the housing 35 is arranged with its axis at an angle to the axis of the gear shifting shaft 58. The universal joint 59 furthermore has the advantage that during mounting of the actuator system there is no need for exactly aligning the shaft 36 and the gear shifting shaft 58. This allows for a simple mounting of the actuator system without requiring adjusting operations. This will be explained in more detail with the aid of FIGS. 21 and 22.

Figure 6:
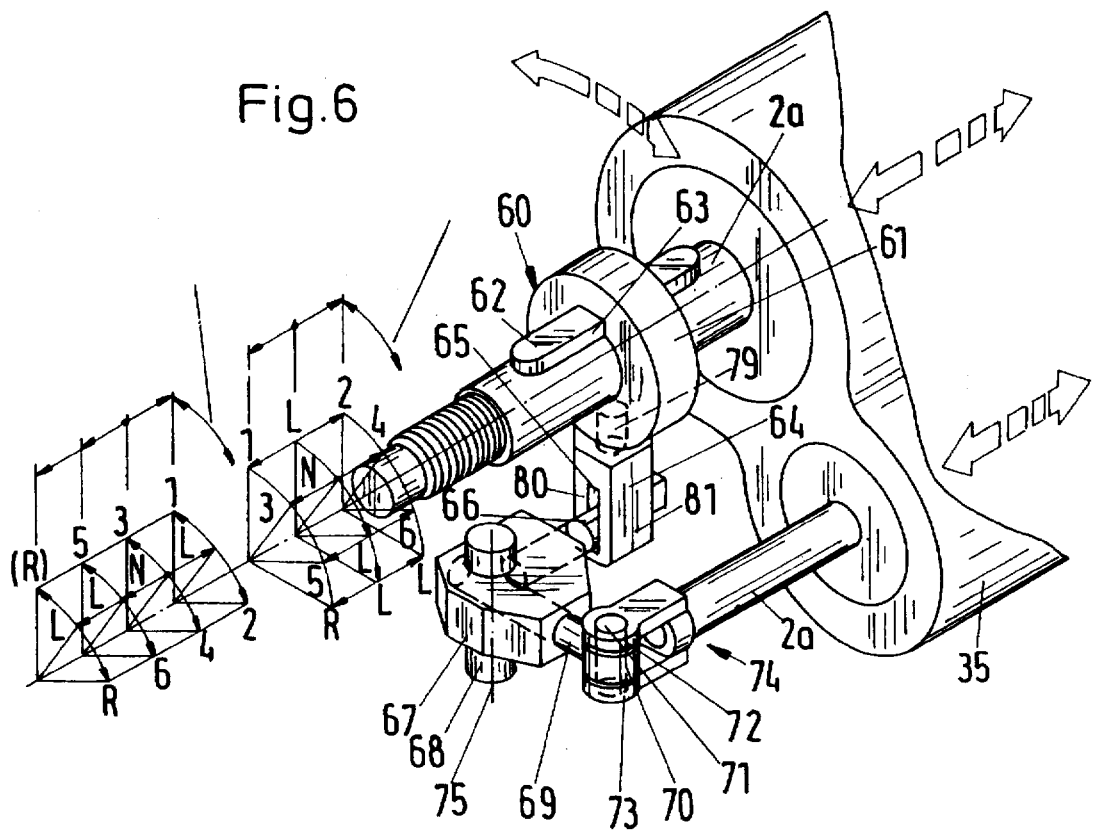

FIG. 6 shows a further possibility to kinematically couple the two pistons 2a of two actuators of an actuator system. The pistons 2a are arranged parallel to one another within a common housing 35. A follower 60 with its annular part 61 is fixedly connected to one of the piston 2a which is axially non-displaceably supported within the housing 54 (FIG. 3). The piston 2a is provided with a feather key 62 which engages a corresponding groove 63 of the annular part 61 and which serves as a rotational securing device. An arm 64 extends radially from the annular part 61 which has a through opening 65. An arm 66 of a base body 67 extends therethrough which is supported on an axis extending perpendicular to the piston 2a. The arm 66 is rotatably supported about an axis at the base body 67. The arm 64 is in the form of a ring which is rotatable about an axis 79 relative to the ring part 61 which axis 79 is perpendicular to the piston 2a. The through opening 65 of the arm 64 is delimited by parallel side walls 80 and 81 which rest at the flattened sides of the arm 66.

A further arm 69 extends from the base body 67 which is positioned at a right angle to the arm 66 and is thus also positioned at a right angle to the piston 2a. The arm 69 is supported within the base body 67 so as to be displaceable in the axial direction. The free end of the arm 69 has a bearing eye 70 through which one bolt 71 extends. Its ends are connected to two legs 72, 73 of a fork member 74 which is connected to the piston 2a external to the housing 35.

The two pistons 2a are axially displaced in the aforedescribed manner into the respective switching positions. With the axial displacement of the piston 2a provided with the follower 60 the respective gear of the gear shifting mechanism is selected. Each switching position of the piston 2a corresponds to one gear selection of the gear shifting mechanism. With the piston 2a having connected thereto the fork member 74 the respective shifting path is selected.

When this piston 2a is axially displaced into the respective switching position as disclosed above, via the arm 69 the base body 67 is rotated about the longitudinal center line 75 of the axis 68. Since the arm 69 in its longitudinal direction is displaceable relative to the base body 67, a length adjustment required for the pivoting movement is possible without problems. The other arm 66 of the base body 67 is pivoted in a corresponding manner whereby via the follower 60 the piston 2a is rotated in its central position (FIG. 1a and 2a) about its axis. This rotational movement is again possible without problems because the arm 66 is supported so as to be rotatable about an axis within the base body 67 and the arm 64 is rotatable about the axis 79 relative to the annular part 61. During this rotational movement of the piston 2a and thus the pivot movement of the follower 60 a relative movement occurs between the sidewalls 80, 81 of the arm 64 and the arm 66.

Figure 7:
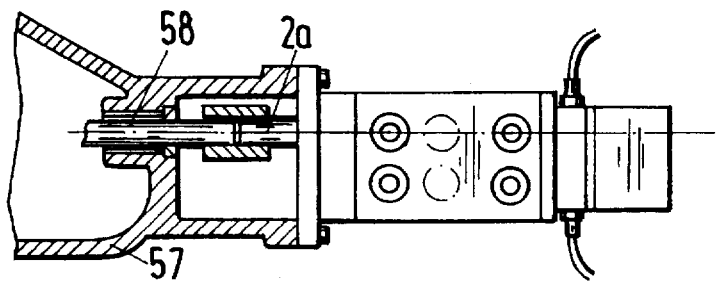

The piston 2a, provided with the follower 60, can be directly connected to the gear shifting shaft of the gear shifting mechanism. This is represented in an exemplary manner in FIG. 7. In contrast to the embodiment according to FIGS. 4 and 5 the gear shifting shaft 58 of the gear shifting mechanism 57 extends parallel to the pistons 2a and is aligned with one of the pistons. It is, of course, also possible to connect an intermediate shaft to the piston 2a at the follower which is coupled in turn with the gear shifting shaft 58 of the gear shifting mechanism 57.

In the actuator system according to FIG. 6 it is, of course, possible to perform the selection of the shifting path via the piston 2a connected to the forked member. Since the axial displacement of this piston via the base body 67 results in a rotational movement of the other piston 2a, in this manner the gear selection is performed by a rotational movement of the piston 2a at the follower. By axial displacement of the piston 2a at the follower the respective shifting path is selected. For this shifting path selection the piston 2a at the follower is in its center position as explained in detail in connection with FIGs. 1a, respectively, 2a. Such an embodiment is provided for a correspondingly designed gear shifting mechanism.

The arm 69 can be simply pivoted via the bearing eye 70 on the bolt 71 of the forked member 74. In conjunction with the axial displacement of the arm 69 within the base body 67 a reliable function is ensured in each switching position of the corresponding piston 2a.

Figure 8:
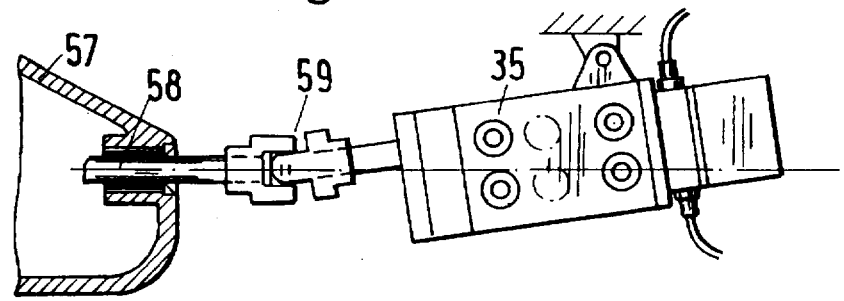

FIG. 8 shows an embodiment in which the gear shifting shaft 58 of the gear shifting mechanism 57 is coupled via a universal joint 59 to the actuator system. Accordingly, the housing 35 of this actuator system can be positioned at an angle to the gear shifting shaft 58 with its longitudinal axis.

In all of the aforedescribed embodiments, depending on the design of the gear shifting mechanism 57, the actuators according to FIG. 1 or FIG. 2 can be used for the actuator system.

FIGS. 9 to 20 show different exemplary embodiments of actuator systems having in common that the piston of the actuators are parallel to one another. The connection of the two pistons of the actuators is not represented in these figures. It can be realized in the manner as disclosed in connection with FIGS. 3 and 6. However, of course, other suitable kinematic couplings between the parallel extending pistons can be used.

Figure 9:
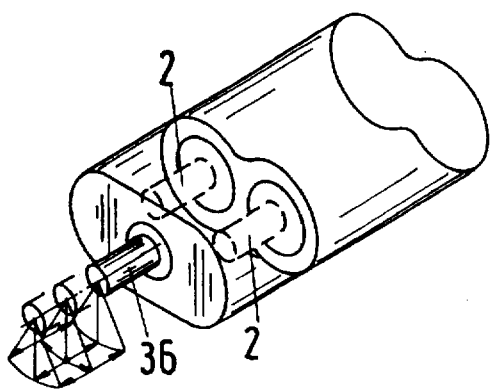
Figure 10:
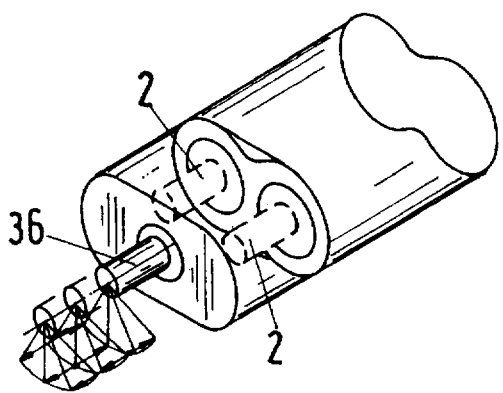

FIG. 9 shows an actuator system in which the shaft 36 is parallel to the piston 2. The shaft can be an intermediate shaft for coupling the actuator system with the gear shifting shaft 58 of the gear shifting mechanism 57. The shaft may also be the gear shifting shaft of the gear shifting mechanism.

The shaft 36 according to FIG. 9 rotated about its axis for selecting the shifting path is and is axially displaced for selecting the respective gear. The different switching positions are represented in FIG. 9. The various switching paths and the different gears can be taken from the corresponding switching diagram.

In the embodiment according to FIG. 10, the shaft 36 is again arranged parallel to the piston 2. The gear shifting mechanism has four switching paths so that upon rotation of the shaft 36 four different positions can be selected. In order to select the respective gear in the selected switching path, the shaft 36 is correspondingly axially displaced.

Figure 11:
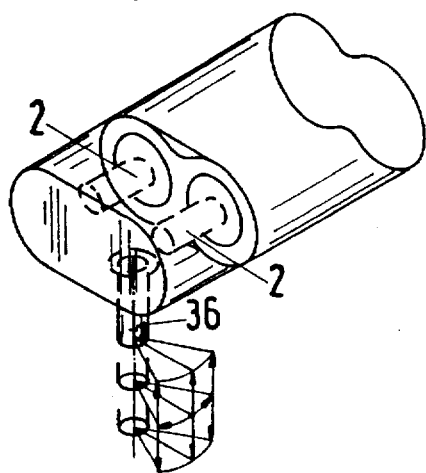

In the actuator system according to FIG. 11 the shaft 36 is positioned perpendicular to the two parallel extending pistons. For selecting the shifting path, the shaft 36 is rotated about its axis. In order to select the respective gear, the shaft 36 is axially displaced. The gear shifting mechanism has three switching paths so that the shaft 36 can be rotated in three different positions.

Figure 12:
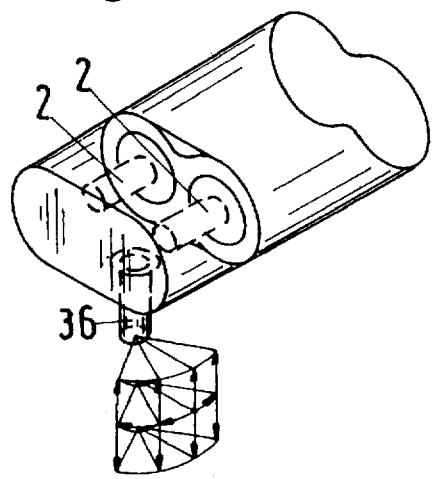

In the embodiment according to FIG. 12, the shaft 36 can select four different shifting paths by rotation. The gears in the selected shifting paths are selected by axial displacement of the shaft 36.

In the disclosed actuator systems the forces acting on the shaft 36 with respect to selecting the shifting paths and the gears are very different. The ratio is approximately 1 to 6. This ratio is not generated by a pressure reduction for the shifting path selection. The two pistons of the actuator system are directly connected to the same hydraulic supply system. In order to avoid the need for pressure reduction valves, the active surface areas at the respective pistons for selecting the shifting paths are minimized correspondingly. The actuator for selecting the gears must provide due to the synchronization substantially higher forces as the one for selecting the switching paths. For this reason, the actuators for the selection of the gears with respect to the active surface areas are of greater size. Otherwise, the actuators for selecting the shifting paths and for selecting the gears are of the same construction.

FIGS. 13 and 14 show an embodiment in which for the two actuators of the actuator system two separate housings 35' and 35" are used. In the area in which the two housings abut one another, the housing has twice the wall thickness. Thus, the actuator system with two separate housings 35', 35" is relatively large. For a wall thickness s and a diameter d of the axial bore of the housing the total height B of the actuator system is 2d+4s.

In the embodiment according to FIGS. 15 and 16 the two housings are combined to a single housing 35. The total height B is only 2d+3s. Thus, an actuator system with a common housing 35 is substantially more compact than the embodiment according to FIGS. 13 and 14.

FIGS. 17 to 20 show actuator systems in which, in contrast to the embodiments of FIGS. 9 to 12, the selection of the shifting paths is achieved by axial displacement of the shaft 36 and the selection of the gears is achieved by rotation of the shaft.

In the embodiment according to FIG. 17, the shaft 36 is again parallel to the piston 2. By axial displacement of the shaft 36 the respective shifting path is selected. Subsequently, the shaft 36 is rotated about its axis in order to select the respective gear. This actuator system is used for gear shifting mechanisms that have three shifting paths.

The actuator system according to FIG. 18 is used for gear shifting mechanisms having four shifting paths. The shaft 36 is again parallel to the piston 2 and can be positioned by axial displacement into four different switching positions. In this manner, the respective shifting path is selected. Subsequently, the shaft 36 is rotated about its axis in order to select the respective gear path.

In the embodiment according to FIG. 19, the shaft 36 extends perpendicular to the piston 2. The selection of the shifting path is carried out by axial displacement of the shaft 36 while the selection of the gears is achieved by rotation of the shaft. This actuator system is used for gear shifting mechanisms with three shifting paths.

The actuator system according to FIG. 20 is used for gear shifting mechanisms having four shifting paths. In this embodiment the shaft 36 is again perpendicular to the piston 2. The shaft 36 for selecting the shifting path can be axially displaced into four different positions. By rotation about the axis the respective gear is selected.

With the aid of FIGS. 21 and 22 the embodiment of the universal joint 59 will be explained in more detail with which the shaft 36 is coupled to the gear shifting shaft 58 of the gear shifting mechanism 57. The universal joint 59 comprises a fork member 82 connected to the free end of the gear shifting shaft 58 which is connected in a suitable manner, for example, by screws with the gear shifting shaft 58. Between the legs of the fork member, of which in FIG. 21 only the leg 83 is represented, a parallelepipedal coupling member 84 is provided that is rotatably supported with bolts 85 at the legs. The coupling piece 84 is penetrated by a further bolt 86 which is perpendicular to the bolt 85 and is supported at the legs 87 and 88 of a second fork member 89. The coupling piece 84 is thus surrounded on four sides, positioned at a right angle relative to one another, by the legs 83 and 87, 88 of the two fork members 82 and 89.

The fork member 89 in the area external to the legs 87, 88 is provided with an inner thread with which it can be threaded onto the free end of the shaft 36. As soon as the mounting position of the actuator system has been reached, the forked member 89 is clamped onto the shaft 36 with two screws 90, 91. They extend perpendicular to the slots 92 and 93 of the fork member 89 which is provided with corresponding threaded bores 94 and 95. The heads of the screws 90, 91 are preferably countersunk within the fork member 89.

The use of the universal joint 59 has the advantage that the actuator system can be simply coupled and mounted at any desired spatial angle relative to the gear shifting shaft 58 of the gear shifting mechanism 57 without having to take into consideration tolerances at the components and without requiring alignment work. During mounting the gear shifting shaft 58 of the gear shifting mechanism 57 is first positioned in a central neutral position. The pistons of the actuator system are then switched into a position corresponding to a neutral position of the gear shifting mechanism 57. The neutral position, respectively, the corresponding position of the pistons of the actuator system are identical to the switching positions of the piston described in connection with FIGS. 1 and 2 which can be switched for a suitable valve selection in a simple manner. The universal joint 59 is then premounted with its fork member 89 on the shaft 36 without tightening the screws 90, 91. The actuator system is moved from the position indicated in dashed lines in FIG. 21 toward the gear shifting mechanism 57 and the fork member 82 is slipped onto the gear shifting shaft 58 and is subsequently positive-lockingly connected in a suitable manner. Since the other fork member 89 is not yet clamped to the shaft 36, the actuator system can thus be rotated about its axis and, furthermore, can be pivoted about the axis of the bolt 85. In this manner, the actuator system can be positioned without difficulties in the desired mounting position. The actuator system is fastened to a housing 96 which is fixedly connected to the gear shifting mechanism housing 56. After connecting the actuator system to the housing 96, the screws 90, 91 are tightened, and in this manner the forked member 89 is connected to the shaft 36 so as to be fixed and axially non-displaceable relative thereto.

The present invention is, of course, in no way restricted to the specific disclosure of the specification and drawings, but also encompasses any modifications within the scope of the appended claims.

We claim:

1. An actuator system for a gear shifting mechanism with a gear shifting shaft of a motor vehicle, said actuator system comprising:
   a first actuator having a first control member moveable into various first switching positions;
   a second actuator having a second control member moveable into various second switching positions;
   one of said first and second actuators displaces the gear shifting shaft in the axial direction of the gear shifting shaft and the other of said first and second actuators rotates the gear shifting shaft;
   said first and said second control members have axes positioned parallel to one another;
   a kinematic coupling device connecting said first and said second control members and the gear shifting shaft;
   wherein said coupling device comprises an angular lever with two angularly positioned arms, wherein said angular lever is pivotable about a pivot axis and wherein said pivot axis is positioned angularly to said axes of said first and said second control members.

2. An actuator system according to claim 1, wherein said two arms are positioned at a right angle to one another and wherein said pivot axis is positioned at a right angle to said axes of said first and second control members.

3. An actuator system according to claim 1, wherein said two arms are coupled to said control members.

4. An actuator system according to claim 1, wherein one of said two arms has a longitudinal axis and is connected to said angular lever so as to be rotatable about said longitudinal axis.

5. An actuator system according to claim 4, comprising a follower connected to said first control member, wherein said follower has an opening through which said one of said two arms extends.

6. An actuator system according to claim 5, wherein the other of said two arms has a longitudinal axis and is connected to said angular lever so as to be axially displaceable in a direction of said longitudinal axis.

7. An actuator system according to claim 7, wherein said other of said two arms is pivotably connected to said second control member.

8. An actuator system according to claim 9, further comprising a bolt fixedly connected to said second control member, wherein said bolt extends parallel to said pivot axis of said angular piece and wherein said other of said two arms is pivotably supported at said bolt.

9. An actuator system according to claim 8, further comprising a fork member with two legs fixedly connected to said second control member, wherein said bolt is fastened to said two legs.

10. An actuator system according to claim 5, wherein said first control member is coupled to the gear shifting shaft.

11. An actuator system according to claim 1, wherein one of said two arms is pivotably connected to said first control member.

12. An actuator system according to claim 11, wherein said first control member has two followers spaced apart from one another in an axial direction of said first control member and wherein a free end of said one of said two arms is positioned between said followers.

13. An actuator system according to claim 12, wherein said followers are annular collars.

14. An actuator system according to claim 12, wherein said free end of said one of said two arms has curved surfaces and wherein said followers have facing sides, wherein said curved surfaces rest at said facing sides of said followers.

15. An actuator system according to claim 11, further comprising a shaft, wherein the other of said two arms is coupled to said shaft.

16. An actuator system according to claim 15, wherein said shaft extends perpendicular to said first and second control members.

17. An actuator system according to claim 15, wherein said shaft extends perpendicular to said pivot axis.

18. An actuator system according to claim 15, wherein said other of said two arms is pivotably connected to said shaft.

19. An actuator system according to claim 15, wherein said shaft comprises a recess and wherein said other of said two arms engages said recess.

20. An actuator system according to claim 19, wherein said recess has two oppositely positioned walls spaced from one another in the axial direction of said shaft and wherein said other of said two arms rests at said oppositely positioned walls.

21. An actuator system according to claim 20, wherein said other of said two arms has curved surfaces wherein said curved surfaces rests at said oppositely positioned walls of said recess.

22. An actuator system according to claim 15, wherein said shaft is pivotably connected to said second control member.

23. An actuator system according to claim 22, wherein said shaft is axially displaceable relative to said first and second control members.

24. An actuator system according to claim 22, wherein said second control member in an axial direction thereof is positive-lockingly connected to said shaft.

25. An actuator system according to claim 24, wherein said second control member comprises a bushing extending at a right angle to the axis of said control member, wherein said bushing has an axis extending parallel to an axis of said shaft.

26. An actuator system according to claim 25, further comprising a follower fixedly connected to said shaft and extending into said bushing.

27. An actuator according to claim 26, wherein said follower comprises a ball resting in any switching position of said shaft at an inner wall of said bushing.

28. An actuator according to claim 26, further comprising a plate fixedly connected to said shaft and radially extending therefrom, wherein said follower is connected to said plate.

29. An actuator system according to claim 15, wherein said shaft is the gear shifting shaft.

30. An actuator system according to claim 15, wherein said shaft is coupled to the gear shifting shaft.

31. An actuator system according to claim 1, wherein each one of said first and second control members has a longitudinal axis and is rotatable about said longitudinal axis.

32. An actuator system according to claim 1, wherein the gear shifting shaft is positioned angularly to said first and second control members.

33. An actuator system according to claim 32, wherein the gear shifting shaft is positioned perpendicular to said first and second control members.

34. An actuator system according to claim 1, wherein the gear shifting shaft is positioned parallel to said first and second control members.

35. An actuator according to claim 1, further comprising a common housing, wherein said first and second control members are positioned in said common housing.

36. An actuator system for a gear shifting mechanism with a gear shifting shaft of a motor vehicle, said actuator system comprising:

a first actuator having a first control member moveable into various first switching positions;

a second actuator having a second control member moveable into various second switching positions;

one of said first and second actuators displaces the gear shifting shaft in the axial direction of the gear shifting shaft and the other of said first and second actuators rotates the gear shifting shaft;

said first and said second control members have axes positioned parallel to one another;

a shaft to which said first and said second control members are coupled;

a kinematic coupling device connecting said first and said second control members and the gear shifting shaft;

a universal joint for coupling said kinematic coupling device to the gear shifting shaft;

wherein said universal joint comprises a first fork member fixedly connected to said shaft and a second fork member connected to said gear shifting shaft; and wherein said first fork member is clamped with at least one clamping screw to said shaft.

37. An actuator system according to claim 36, wherein said first fork member has at least one slot extending over a portion of its length and wherein said at least one clamping screw extends perpendicular to said slot.

* * * * *